United States Patent
Wang et al.

(10) Patent No.: US 11,550,927 B2
(45) Date of Patent: Jan. 10, 2023

(54) STORAGE DATA ENCRYPTION/DECRYPTION APPARATUS AND METHOD

(71) Applicant: C-SKY Microsystems Co., Ltd., Zhejiang (CN)

(72) Inventors: Jie Wang, Hangzhou (CN); Aiyong Ma, Hangzhou (CN); Jiaqi Xi, Hangzhou (CN); Xinglong Gao, Hangzhou (CN)

(73) Assignee: C-SKY Microsystems Co., Ltd., Zhejiang (CN)

( * ) Notice: Subject to any disclaimer, the term of this patent is extended or adjusted under 35 U.S.C. 154(b) by 178 days.

(21) Appl. No.: 16/175,782

(22) Filed: Oct. 30, 2018

(65) Prior Publication Data
US 2019/0095630 A1 Mar. 28, 2019

Related U.S. Application Data

(63) Continuation of application No. PCT/CN2018/107673, filed on Sep. 26, 2018.

(30) Foreign Application Priority Data

Sep. 26, 2017 (CN) .......................... 201710881211.4

(51) Int. Cl.
*G06F 21/60* (2013.01)
*H04L 9/08* (2006.01)
*G06F 21/62* (2013.01)

(52) U.S. Cl.
CPC ............ *G06F 21/602* (2013.01); *G06F 21/62* (2013.01); *H04L 9/0869* (2013.01); *H04L 9/0894* (2013.01); *G06F 2221/2143* (2013.01)

(58) Field of Classification Search
USPC .......... 380/46, 255, 264, 276; 726/2, 21, 36; 713/150, 163, 181
See application file for complete search history.

(56) References Cited

U.S. PATENT DOCUMENTS

| | | | |
|---|---|---|---|
| 2004/0015948 A1* | 1/2004 | Sueyoshi | G06F 9/5038 717/170 |
| 2007/0150755 A1* | 6/2007 | Makii | G06F 21/12 713/193 |

(Continued)

FOREIGN PATENT DOCUMENTS

| | | |
|---|---|---|
| CN | 1830030 A | 9/2006 |
| CN | 101582109 A | 11/2009 |

(Continued)

OTHER PUBLICATIONS

Extended European Search Report and supplementary European search report in European Application No. 18862995.0, dated Sep. 28, 2020 (10 pgs).

(Continued)

*Primary Examiner* — Sharif E Ullah
(74) *Attorney, Agent, or Firm* — Finnegan, Henderson, Farabow, Garrett & Dunner, LLP

(57) ABSTRACT

Embodiments of the disclosure provide a method and apparatus for encrypting and decrypting data. The method for encrypting data in a computer system can include: receiving, by a memory operation module, a first data and a second data for encryption; determining at least one storage area for a first encrypted data corresponding to the first data and a second encrypted data corresponding to the second data; generating at least one key based on the first and second data and the at least one storage area; and encrypting the first data and the second data using the at least one key to generate the first encrypted data and the second encrypted, respectively.

12 Claims, 3 Drawing Sheets

(56) References Cited

U.S. PATENT DOCUMENTS

| | | | | |
|---|---|---|---|---|
| 2010/0031058 | A1* | 2/2010 | Kito | G06F 21/78 713/193 |
| 2012/0042157 | A1* | 2/2012 | Leclercq | G06F 21/72 713/2 |
| 2013/0086385 | A1* | 4/2013 | Poeluev | H04L 9/3252 713/176 |
| 2014/0010371 | A1* | 1/2014 | Khazan | H04L 9/0894 380/278 |
| 2015/0006914 | A1* | 1/2015 | Oshida | G06F 21/72 713/193 |

FOREIGN PATENT DOCUMENTS

| | | |
|---|---|---|
| CN | 102346820 A | 2/2012 |
| CN | 103931137 A | 7/2014 |
| CN | 107516047 A | 12/2017 |
| CN | 107590402 A | 1/2018 |
| EP | 1983462 A2 | 10/2008 |
| WO | WO03027816 A1 | 4/2003 |
| WO | WO2019062769 A1 | 4/2019 |

OTHER PUBLICATIONS

Karen Horovitz et al. "Protecting Partial Regions in FPGA Bitstreams" IEEE, pp. 123-127 (2017).

Le Guan et al. "Protecting Private Keys against Memory Disclosure Attacks using Hardware Transactional Memory" IEEE Computer Society, pp. 3-19 2015.

Simona Buchovecka et al. "True random number generator based on ring oscillator PUF circuit." Microprocessors and Microsystems, vol. 53 pp. 33-41, (2017).

PCT International Search Report and Written Opinion dated Jan. 4, 2019, issued in corresponding International Application No. PCT/CN2018/107673 (10 pgs.).

First Chinese Search Report issued in corresponding Chinese Application No. 201710881211.4 dated Mar. 25, 2019 (2 pages).

* cited by examiner

STORAGE DATA ENCRYPTION/DECRYPTION APPARATUS AND METHOD

CROSS REFERENCE TO RELATED APPLICATION

The present application claims priority to International Application No. PCT/CN2018/107673, filed Sep. 26, 2018, which claims the benefits of priority to Chinese application number 201710881211.4, filed Sep. 26, 2017, both of which are incorporated by reference their entireties.

BACKGROUND

With the accelerating pace of global informatization, networks and mobile Internet devices have been closely linked to people's life and have become an indispensable carrier for information exchange in the modern society. As the performance of mobile smart devices improves significantly and the coverage of the high-speed mobile Internet expands continuously, mobile offices and mobile financial transactions are popularized. But there are increasingly more threats to office data and financial transaction data.

To solve the data security problem, it is necessary to improve the level of computer technologies, cryptological theories, and network applications. Currently, the information security protection has been developed from conventional single-point information encryption to an information assurance system that is constructed based on chip level hardware protection and that covers the entire network system. Moreover, a low-cost, small-size high-performance chip design that resists decryption and has an information security protection mechanism has become an inevitable trend. Therefore, a System-on-Chip (SoC) design gradually becomes a new development trend of embedded systems. A chip designer usually integrates an encryption/decryption algorithm and an information security protocol in one SoC chip, which provides a higher level of security. However, the encryption/decryption algorithm integrated in the conventional SoC chip uses a same key for encryption/decryption of different chips or different storage areas in the same chip, and cannot protect data effectively.

SUMMARY OF THE DISCLOSURE

Embodiments of the disclosure provide a method for encrypting data in an integrated circuit. The method can include: receiving, by a memory operation module, a first data and a second data for encryption; determining at least one storage area for a first encrypted data corresponding to the first data and a second encrypted data corresponding to the second data; generating at least one key based on the first and second data and the at least one storage area; and encrypting the first data and the second data using the at least one key to generate the first encrypted data and the second encrypted, respectively.

Embodiments of the disclosure further provide a method for decrypting data in an integrated circuit. The method can include: receiving, by a memory operation module, a first encrypted data and a second encrypted data for decryption; acquiring at least one key corresponding to the first and second encrypted data from a key memory; and decrypting the first and second encrypted data using the at least one key, wherein the at least one key is associated with the first and second encrypted data and at least one storage area for the first and second encrypted data.

Embodiments of the disclosure also provide an apparatus for encrypting data in a computer system. The apparatus can include: a memory operation module having circuitry for receiving a first data and a second data for encryption; circuitry, configured for determining at least one storage area for a first encrypted data corresponding to the first data and a second encrypted data corresponding to the second data; a true random number generator, configured for generating at least one key based on the first and second data and the at least one storage area; and a data encryption/decryption module having circuitry for encrypting the first data and the second data using the at least one key to generate the first encrypted data and the second encrypted, respectively.

Embodiments of the disclosure also provide an apparatus for decrypting data in a computer system. The apparatus can include: a memory operation module having circuitry for receiving a first encrypted data and a second encrypted data for decryption; a data encryption/decryption module having circuitry for acquiring at least one key corresponding to the first and second encrypted data from a key memory, and decrypting the first and second encrypted data using the at least one key, wherein the at least one key is associated with the first and second encrypted data and at least one storage area for the first and second encrypted data.

BRIEF DESCRIPTION OF THE DRAWINGS

To illustrate the technical solutions in embodiments of the present disclosure more clearly, the accompanying drawings required for describing the embodiments are introduced briefly in the following. It is apparent that the accompanying drawings in the following description are only some embodiments of the present disclosure. Those of ordinary skill in the art can obtain other drawings according to the accompanying drawings without creative efforts.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses, systems, and methods consistent with aspects related to the subject matter as recited in the appended claims.

To overcome the issues with conventional systems, the disclosed embodiments provide a storage data encryption/decryption apparatus and method that can use different keys for encryption/decryption of data in different chips and different storage areas in the same chip, and can complete data storage and read/write operations more efficiently.

Figure 1:
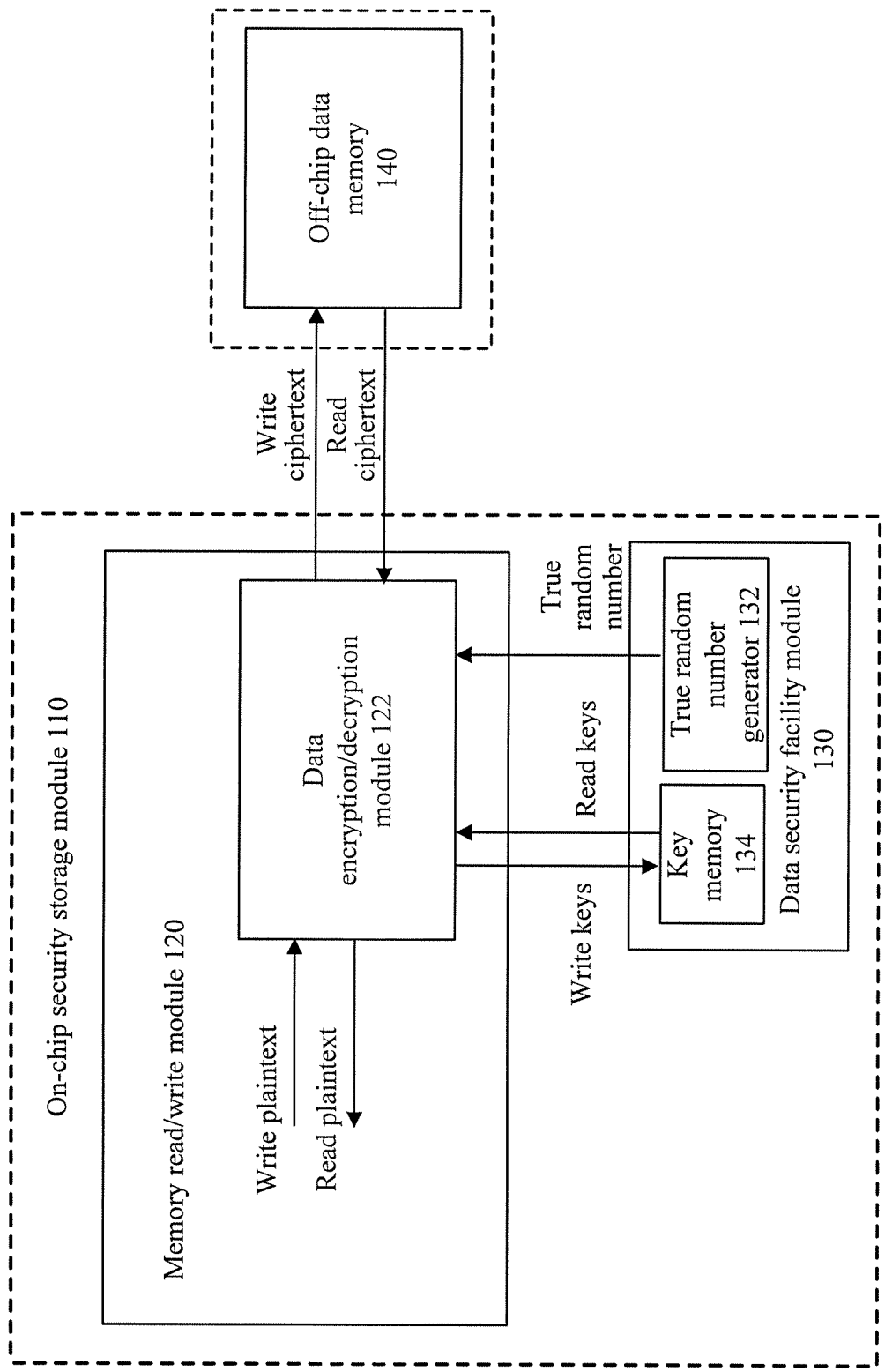
FIG. 1 is a schematic diagram of an exemplary apparatus for encrypting and decrypting data, according to embodiments of the present disclosure.

The present disclosure provides an apparatus for encrypting and decrypting data. FIG. 1 is a schematic diagram of an apparatus for encrypting and decrypting data, according to embodiments of the present disclosure. The apparatus can be one or more integrated circuits, such as a system-on-chip (SOC). As shown in FIG. 1, the apparatus can include an on-chip security storage module 110 and an off-chip data memory 140. The on-chip security storage module 110 can be configured to read and write data for encryption and decryption, and the off-chip data memory 150 can be configured to store the data.

The on-chip security storage module 110 further includes a memory operation module 120 and a data security facility module 130.

The memory operation module 120 can be configured to read and write keys associated with encryption and decryption. The memory operation module 120 can also include circuitry for receiving data for encryption or decryption. It is appreciated that the data can be received in at least one piece. For example, the data can include a first data and a second data. The memory operation module can be further configured to encrypt and decrypt data. The memory operation module can include a data encryption/decryption module 122 can include circuitry to use different encryption/decryption algorithms for different chips or different off-chip data memories. The algorithm can include an "OR" algorithm, a sequence rearrangement algorithm, a data replacement algorithm, and the like. Particularly, the key acquisition and the encryption/decryption can be implemented by hardware, and be transparent to software. For example, the data encryption/decryption module 122 can include circuitry to acquire keys and decrypt data using the acquired keys.

The security facility module 130 can include a true random number generator 132 and a key memory 134. The true random number generator 132 can include circuitry to generate random keys and provide the keys to the data encryption/decryption module 122 to perform an encryption/decryption operation on data. The key memory 134 can be configured to store multiple keys. The keys can be used to perform the encryption/decryption operations on data in multiple different off-chip data storage areas. In some embodiments, the keys can be generated based on the data and the storage area for the data.

The off-chip data memory 140 can be configured to store encrypted data only. The encrypted data can be separated into multiple data storage areas. Different keys can be used for encryption/decryption on data stored in different storage areas. It is also possible to determine whether to perform encryption/decryption selectively in different storage areas. However, data in the same storage area can only be encrypted/decrypted by using a same key. As such, when the off-chip data memory 140 is replaced with a new memory, data of the new memory cannot be encrypted/decrypted by using the earlier built-in key, and the chip associated with the new memory cannot work normally. In some embodiments, it may be advantageous when the off-chip data memory 140 and the key memory 134 are deployed on the same physical storage medium.

In a working process, the data encryption/decryption module 122 can output true random numbers generated by the true random number generator 132 into the key memory 134 as keys. The data encryption/decryption module 122 can further encrypt, by using the keys in the key memory 134, plaintext data written into the off-chip data memory 140, write the data into the off-chip data memory 140 according to a read/write time sequence of the off-chip memory 140, and decrypt ciphertext data read from an off-chip data memory group. The memory operation module 120 can output unencrypted written data to the data encryption/decryption module 122, and input decrypted read data of the data encryption/decryption module 122.

Figure 2:
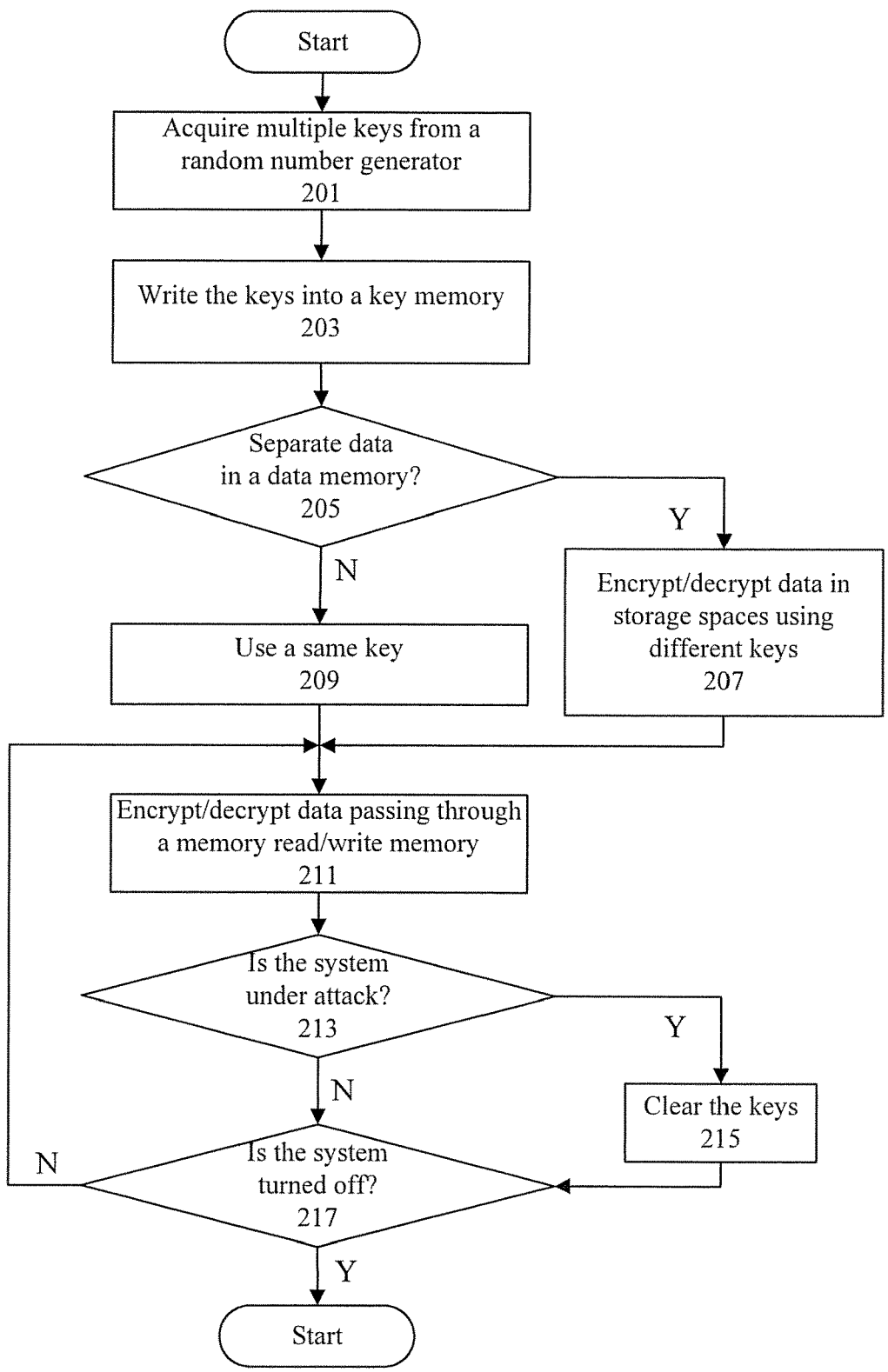
FIG. 2 is a flowchart of an exemplary encryption/decryption process, according to embodiments of the present disclosure.

FIG. 2 is a schematic diagram of encryption and decryption, according to embodiments of the present disclosure. As shown in FIG. 2, after a system associated with the integrated circuit starts, a true random number generator (e.g., true random number generator 132) can generate multiple keys (201). For example, the system can run on hardware including the integrated circuit. Then, a data encryption/decryption module (e.g., data encryption/decryption module 122) can write the keys generated by the true random number generator into a key memory (e.g., key memory 134) (203).

It can be determined whether to separate data in a data memory (e.g., off-chip data memory 140) (205). In response to the determination of separating the data in the data memory, the data memory can be divided into multiple data storage areas logically and data in the data storage areas can be encrypted/decrypted selectively (207). It is appreciated that, different keys can be used for the encryption and decryption. In response to the determination of not separating the data in the data memory, the data memory may not be divided into data storage areas, and a same key can be used for encrypting/decrypting data in the entire data storage area (209). Then, data passing through a storage area operation module (e.g., memory operation module 120) can be encrypted/decrypted (211). In embodiments of the present disclosure, the memory operation module can transmit unencrypted written data to the data encryption/decryption module, and the data encryption/decryption module can encrypt the data and store the encrypted data in the off-chip data memory. On the other hand, the off-chip data memory can transmit non-decrypted read data to the data encryption/decryption module. And after decryption is performed by the data encryption/decryption module, decrypted read data can be transmitted to the memory read/write module. For example, the data encryption/decryption module can read keys from an on-chip key memory and encrypt/decrypt data written into the off-chip data memory and data read from the off-chip data memory. Then, it can be further determined whether the system is under attack (213). If the system is under attack, the data encryption/decryption module can clear the keys in the key memory (215), so as to prevent data in the memory from being acquired during the attack. If the system is not under attack, it can be further determined whether the system is turned off (217). If it is determined that the system is turned off, the system can be started. If it is determined that the system is not turned off, data passing through the memory operation module can be then encrypted/decrypted.

Figure 3:
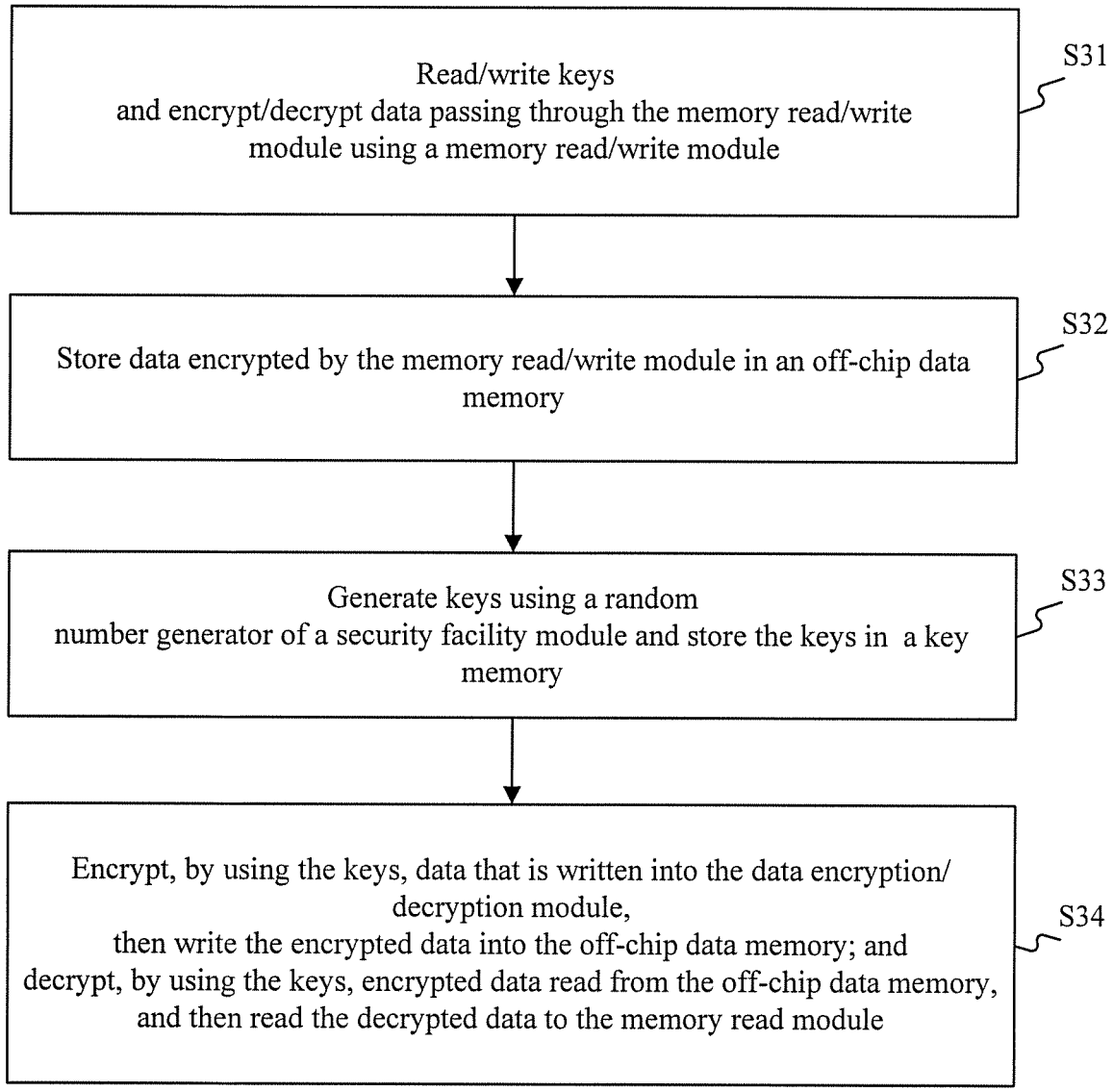
FIG. 3 is a flowchart of an exemplary method for encrypting and decrypting data, according to embodiments of the present disclosure.

Some embodiments of the present disclosure further provide a method for encrypting and decrypting data. FIG. 3 is a flowchart of a method for encrypting and decrypting data, according to embodiments of the present disclosure. As shown in FIG. 3, the method includes steps S31-S34.

In S31, keys can be read and written by, for example, a memory operation module (e.g., memory operation module 120), and data passing through the memory operation module can be encrypted/decrypted. The memory operation module can include a data encryption/decryption module (e.g., data encryption/decryption module 122) configured to run an encryption/decryption algorithm.

In S32, the data encrypted by the memory operation module can be stored in an off-chip data memory (e.g., off-chip data memory 140). In S33, keys can be generated by a true random number generator (e.g., true random number generator 132) of a security facility module, and the generated keys can be stored in a key memory (e.g., key memory 134).

In S34, data that is written by the memory read module into the data encryption/decryption module can be encrypted by the data encryption/decryption module using the keys provided by the security facility module, and the encrypted data can be written into the off-chip data memory. And the data encryption/decryption module can decrypt, by using the keys provided by the security facility module, the encrypted data read from the off-chip data memory, and then transmit the decrypted data to the memory read module.

In the apparatus and method for encrypting and decrypting data provided by the present disclosure, a data memory in a same chip can be divided into multiple storage areas. Each of storage areas can use a key corresponding to the storage area. In different chips, storage areas having an identical address can use different keys, thus ensuring data security. And data access efficiency may not be affected. In addition, when the off-chip data memory is replaced with a new off-chip data memory, the new off-chip data memory cannot be decrypted by using a same built-in key. And by erasing keys in the key memory, encrypted data in the memory cannot be decrypted correctly, thus achieving a strong anti-attack capability.

Exemplary implementations of the present disclosure are described above, but the protection scope of the present disclosure is not limited to these implementations. Any change or replacement that can be easily conceived of by those skilled in the art without departing from the technical scope disclosed by the present disclosure should be covered in the protection scope of the present disclosure. Therefore, the protection scope of the present disclosure should be subject to the protection scope of the claims.

The invention claimed is:

1. A method for encrypting data in an integrated circuit, comprising:
   receiving, by a memory operation module, a first data and a second data to be encrypted;
   determining at least one storage area for storing a first encrypted data corresponding to the first data and a second encrypted data corresponding to the second data;
   generating at least one key based on the first and second data and the at least one storage area, wherein generating the at least one key comprises generating two different keys according to a determination that the first encrypted data and the second encrypted data are to be stored in two different storage areas, respectively, of the integrated circuit; and
   encrypting the first data and the second data using the two different keys, respectively, to generate the first encrypted data and the second encrypted data,
   wherein the two different keys are stored in a key memory of the integrated circuit, and
   wherein the key memory is configured to be cleared in response to a determination that a computer system associated with the integrated circuit is under an attack.

2. The method according to claim 1, wherein
   when the at least one storage area includes a first storage area for the first encrypted data and a second storage area for the second encrypted data and the first storage area is different from the second storage area, the at least one key includes a first key for the first data and a second key, that is different from the first key, for the second data, the first storage area and the second storage area being the two different storage areas and the first key and the second key being the two different keys.

3. The method according to claim 1, wherein the at least one storage area is included in an off-chip data memory.

4. The method according to claim 1, wherein the encryption is transparent to software.

5. An apparatus for encrypting data in a computer system, comprising:
   a memory operation module having circuitry for receiving a first data and a second data for encryption;
   circuitry, configured for determining at least one storage area for storing a first encrypted data corresponding to the first data and a second encrypted data corresponding to the second data;
   a true random number generator, configured for generating at least one key based on the first and second data and the at least one storage area, wherein the true random number generator is configured for generating two different keys according to a determination that the first encrypted data and the second encrypted data are to be stored in two different storage areas, respectively, of one integrated circuit; and
   a data encryption/decryption module having circuitry for encrypting the first data and the second data using the two different keys, respectively, to generate the first encrypted data and the second encrypted,
   wherein the two different keys are stored in a key memory of the integrated circuit, and
   wherein the key memory is configured to be cleared in response to a determination that a computer system associated with the integrated circuit is under an attack.

6. The apparatus according to claim 5, wherein
   when the at least one storage area includes a first storage area for the first encrypted data and a second storage area for the second encrypted data and the first storage area is different from the second storage area, the at least one key includes a first key for the first data and a second key, that is different from the first key, for the second data, the first storage area and the second storage area being the two different storage areas and the first key and the second key being the two different keys.

7. The apparatus according to claim 5, wherein the at least one storage area is included in an off-chip data memory.

8. The apparatus according to claim 5, wherein the encryption is transparent to software.

9. The method according to claim 1, wherein the two different keys include a first key associated with a first storage area of the two different storage areas of the integrated circuit and a second key associated with a second storage area of the two different storage areas of the integrated circuit.

10. The apparatus according to claim 5, wherein the two different keys include a first key associated with a first storage area of the two different storage areas of the one integrated circuit and a second key associated with a second storage area of the two different storage areas of the one integrated circuit.

11. The method according to claim 1, wherein the key memory being an on-chip memory of the integrated circuit and the two different storage areas being included in an off-chip memory of the integrated circuit, and
   the computer system associated with the integrated circuit being under the attack includes the off-chip memory being replaced.

12. The apparatus according to claim 5, wherein the key memory being an on-chip memory of the integrated circuit and the two different storage areas being included in an off-chip memory of the integrated circuit, and the computer system associated with the integrated circuit being under the attack includes the off-chip memory being replaced.

\* \* \* \* \*